(12) United States Patent
Wolf et al.

(10) Patent No.: US 6,829,934 B2
(45) Date of Patent: Dec. 14, 2004

(54) METHOD OF BALANCING ROTORS

(75) Inventors: Robert Wolf, Herbrechtingen (DE); Eva Scheideler, Nattheim (DE); Georg Kugler, Gerstetten (DE)

(73) Assignee: Voith Paper Patent GmbH, Heidenheim (DE)

( * ) Notice: Subject to any disclaimer, the term of this patent is extended or adjusted under 35 U.S.C. 154(b) by 0 days.

(21) Appl. No.: 10/140,482

(22) Filed: May 7, 2002

(65) Prior Publication Data

US 2002/0184946 A1 Dec. 12, 2002

(30) Foreign Application Priority Data

May 8, 2001 (DE) .......................................... 101 22 135

(51) Int. Cl.[7] .............................................. G01M 1/22
(52) U.S. Cl. .......................................... 73/462; 702/56
(58) Field of Search .......................... 73/462, 460, 457, 73/458; 700/279; 702/56

(56) References Cited

U.S. PATENT DOCUMENTS

| | | | | |
|---|---|---|---|---|
| 4,098,127 A | | 7/1978 | Shiga et al. ................... | 73/462 |
| 4,419,894 A | * | 12/1983 | Matumoto .................... | 73/462 |
| 4,607,420 A | | 8/1986 | Vomhoff ...................... | 29/113 |
| 4,773,019 A | * | 9/1988 | Martin et al. ................ | 700/279 |
| 5,149,936 A | * | 9/1992 | Walton, II ............. | 219/121.65 |
| 5,421,199 A | | 6/1995 | Himmler ...................... | 73/462 |
| 5,481,912 A | | 1/1996 | Himmler ...................... | 73/460 |

FOREIGN PATENT DOCUMENTS

| | | | | |
|---|---|---|---|---|
| DE | 1 920 129 | | 10/1970 | |
| DE | 40 15 051 A1 | | 11/1990 | ............ G01M/1/30 |
| DE | 30 44 440 C2 | | 9/1991 | ............ G01M/1/22 |
| DE | 40 32 299 C2 | | 11/1992 | ............ G01M/7/02 |
| DE | 43 10 165 A1 | | 10/1993 | ............ G01M/1/32 |

OTHER PUBLICATIONS

Wilhelm, H., Wolfel, P.: "Betriebswuchten von Walzen in Papiermaschinen." In: Das Papier 6, 1997, pp. 297–302.
Himmler, Günther: Hofmann–Info. Rechnergestütztes Betriebsauswuchten. Impressum 963209808–77.

* cited by examiner

Primary Examiner—John E. Chapman
(74) Attorney, Agent, or Firm—Taylor & Aust, P.C.

(57) ABSTRACT

A method facilitates simultaneously balancing mechanically coupled, synchronously rotating rotors. The rotors have different axes of rotation relative to one another and together define a rotor group to be balanced. Each rotor has at least one of a bearing plane and an other measuring plane associated therewith, the other measuring plane significantly describing vibrations of the each rotor. The rotors within the rotor group together have a number of different angular velocities associated therewith. At least one rotor of the rotor group is equipped with at least one vibration pickup in at least one of each bearing plane and the other measuring plane thereof. As many impulse and phase transmitters are installed in the rotor group as are provided the number of different angular velocities associated with the rotors within the rotor group. At least pertaining vibration signals and a pertaining speed signal are recorded simultaneously, with regard to a respective one of each bearing plane and the other measuring plane. For each bearing plane and the other measuring plane, the coefficients of influence thereof are determined by applying a method of coefficients of influence and setting defined test unbalances. At least one corresponding matrix of coefficients of influence is generated, and a counterbalance mass distribution from the at least one corresponding matrix of coefficients of influence is determined for every operating balance plane of the rotor group. Each bearing plane and measuring plane define one test balance plane.

10 Claims, 3 Drawing Sheets

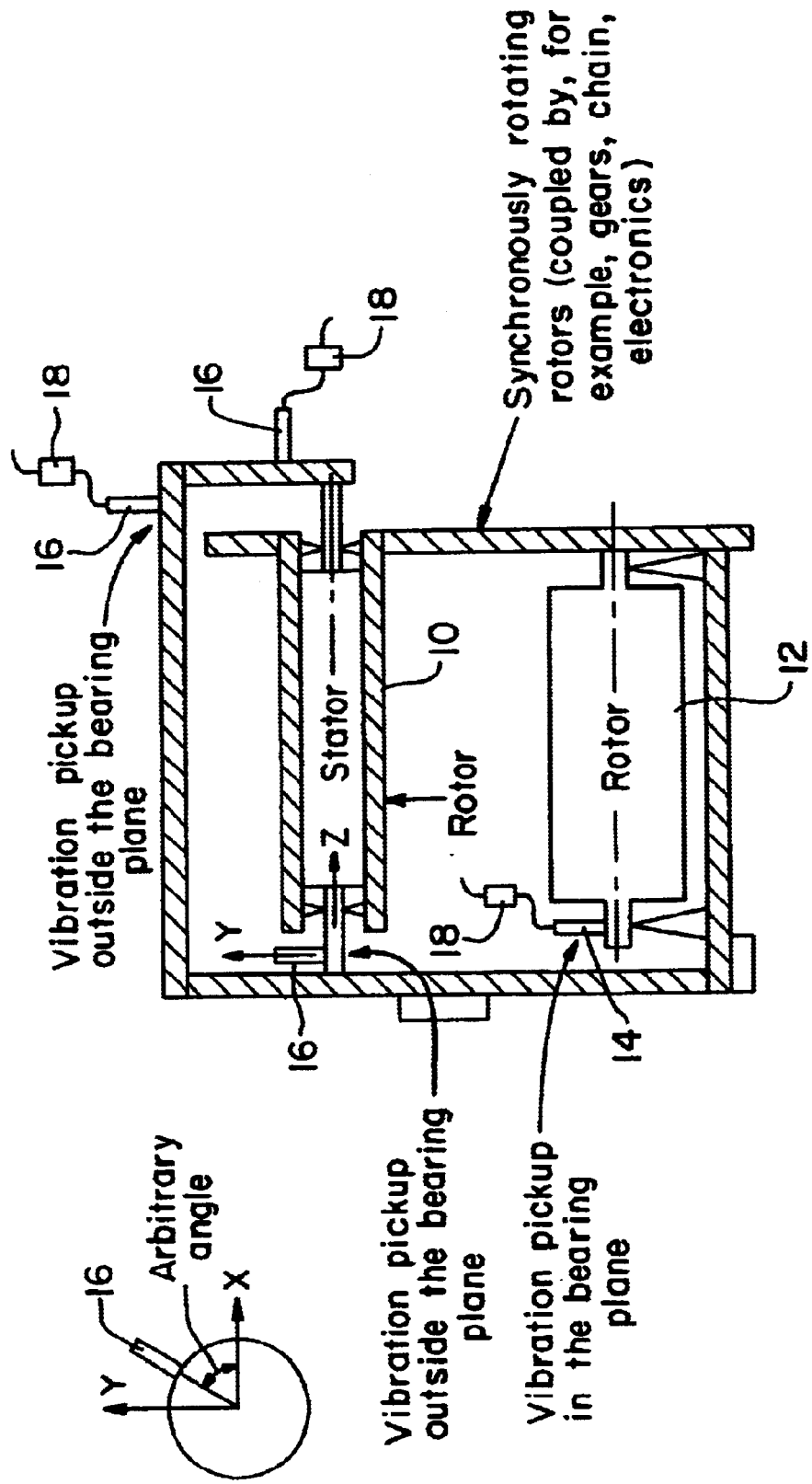

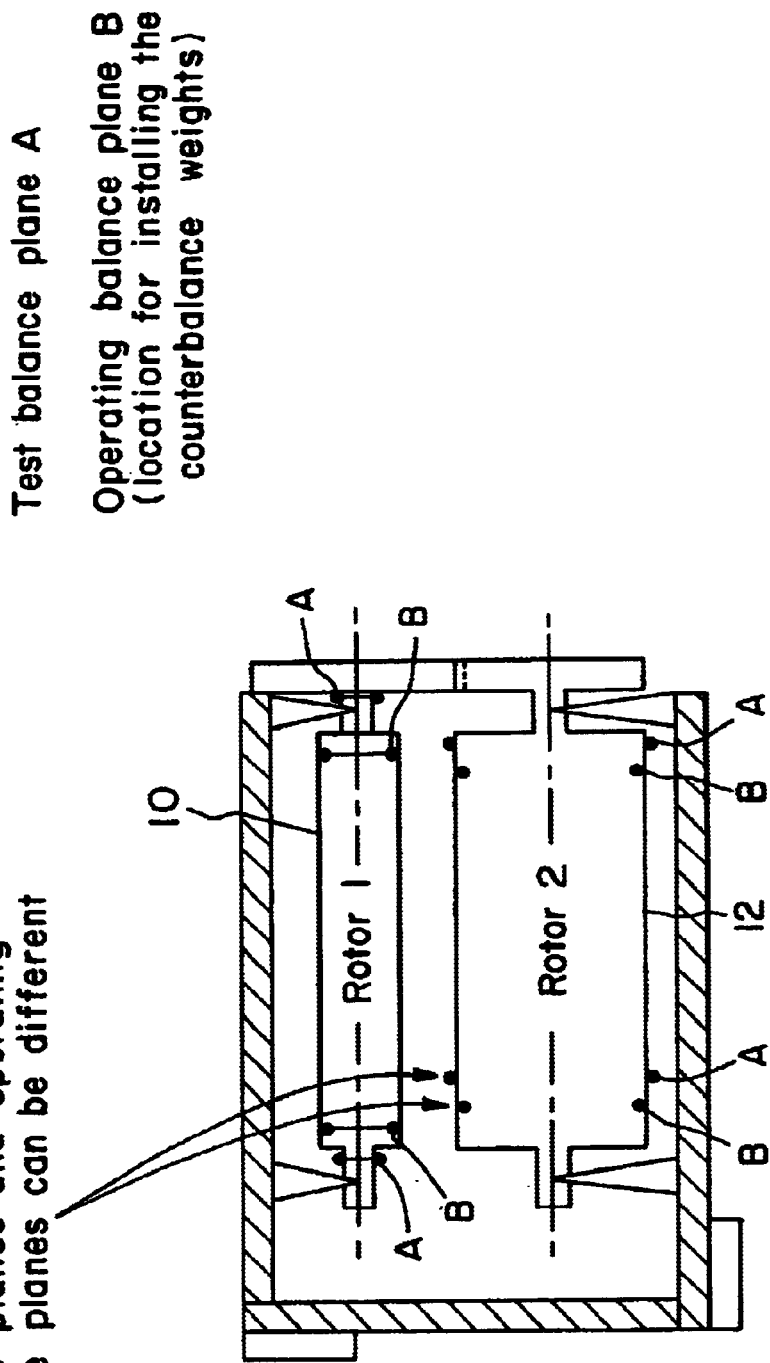

METHOD OF BALANCING ROTORS

BACKGROUND OF THE INVENTION

1. Field of the Invention

The invention relates to a method of simultaneously balancing mechanically coupled, synchronously rotating rotors that have different axes of rotation and, in particular, balancing cylinders and/or rollers of a papermaking machine.

2. Description of the Related Art

To date, cylinder groups, in which synchronously rotating cylinders are driven by only one drive via a transfer case, are balanced by removing parts of the transfer case and then driving and balancing every cylinder individually via an accessory drive.

Such a procedure is, however, very time-consuming and sometimes linked with mechanical risks, as it is necessary to separate connections that have otherwise run during, possibly, years of operation.

Theoretical and practical tests have already been carried out in a considerably simplified laboratory test in which two synchronously rotating cylinders were balanced in a coupled state (Thesis by H. Wilhelm, Fortschritt-Berichte VDI, Reihe 11, "Betriebswuchten gekoppelter Rotoren" (Progress Reports VDI, Series 11, "Operating balancing of coupled rotors"); H. Wilhelm, H. P. Wölfel, "Betriebswuchten von Walzen in Papiermaschinen" ("Operating balancing of rollers in paper-making machines"); Das Papier June 1997, Pages 297 to 302). These tests were carried out under considerably restricted conditions.

SUMMARY OF THE INVENTION

The present invention relates to an improved method of balancing rotors by which it is possible to balance coupled rotors that do not have a common axis of rotation (such as, e.g., turbo sets) in a state ready for operation and/or under near-practice conditions. The method facilitates balancing in the shortest possible time, i.e., with increased economic efficiency and without any mechanical risk. The method should, in particular, be applicable for dryer cylinders, guiding rollers, calender rollers and/or the like.

The invention comprises, in one form thereof, a method of simultaneously balancing mechanically coupled, synchronously rotating rotors that have different axes of rotation, in particular cylinders and/or rollers of a paper-making machine. In this method, the rotor group to be balanced is equipped with, respectively, at least one vibration pickup in every bearing plane and/or in at least one other measuring plane that significantly describes the vibrations of the rotor. As such, as many impulse and phase transmitters are installed in the rotor group to be balanced as are provided different angular velocities of the rotors. At least the pertaining vibration signals and the pertaining speed signal are simultaneously recorded with regard to a respective measuring plane. Applying the method of the coefficients of influence and setting defined test unbalanced masses, the coefficients of influence of every test balance plane are determined for every measuring plane, and at least one corresponding matrix of coefficients of influence is generated. The counterbalance mass distribution is determined for every balance plane of the rotor group from the generated matrix of coefficients of influence, the position of at least one test balance plane being preferably selected different from the at least one operating balance plane corresponding thereto.

The embodiment provides, inter alias, the following advantages:

1) Balancing a rotor group in a coupled state using easily accessible test balance planes is significantly faster than balancing the individual rotors successively or balancing thereof in a coupled state in which the test balance planes and the operating balance planes are identical.
2) Mechanical risks that are generated by decoupling rotors are completely prevented. Possible mechanical risks include, for instance, destruction of or damage to the gearwheels during disassembly, leakage of the gearbox after reassembly, torn off bolted connections and/or the like. Such mechanical risks are prevented by the method according to the invention.

In the above-mentioned thesis by H. Wilhelm, Fortschritt-Berichte VDI, Series 11, "Betriebswuchten gekoppelter Rotoren", a balancing method using coefficients of influence for coupled rotors was already tested on a laboratory test rig. However, this was carried out under the restrictions that the positions of the operating balance planes and the test balance planes that were required during the test balancing runs were identical, and that, for the group of cylinders to be balanced, all the rotors present in the group were operated at a synchronous speed. The thesis did also not consider a combination of elastic and/or rigid rotors in a rotor group to be balanced.

Another difference to be emphasized is that, in connection with the method according to the invention, it is not necessary to measure at the bearings and that it is not necessary to measure the vibrations at all measuring planes, respectively, in the same direction. These are important aspects for practical use, as unobstructed access is not always possible at all bearing planes (cf., e.g., Nipco rollers in calenders), and as it is also not always ensured that the vibrations can be measured at all the relevant measuring planes, respectively, in the same direction.

Furthermore, the position of the operating balance planes (i.e., planes in which the counterbalance masses will subsequently be installed for continuous operation) need not be identical with the position of the test balance planes (i.e., planes in which test balance weights are installed only during the balancing process). To determine the matrix of coefficients of influence, it is rather advantageous to select planes for the test balance weights that are easily accessible and where test balance weights can be mounted and dismounted in the shortest possible time. The counterbalance weights that are determined by use of the matrix of coefficients of influence can be converted to the operating balance planes by the respective mathematical relations.

Rotor vibrations can be recorded by vibration pickups in one or more directions to be specified.

Triggers and/or the like can be used as impulse and phase transmitters.

The rotors can be dryer cylinders, guiding rollers, calender rollers and/or the like.

It is, for instance, possible to select at least one test balance plane in the area of a thread of a pulling screw that is associated to a cylinder cover. As has already been mentioned, the operating balance planes need no longer be identical with the test balance planes.

Balancing can be realized at a rotor speed that can be specified at will. In particular, for elastic rotors, operational balancing is advantageously carried out in the main operating speed range.

Should the rotor group to be balanced not exclusively be composed of rigid rotors but also or only of elastic rotors, the number of balancing planes per rotor must be increased according to the inherent shapes to be balanced. Various matrices of coefficients of influence are then preferably simultaneously determined at different angular velocities to be specified. If necessary, a counterbalance mass distribution, at which vibrations in the measuring planes are minimized for the selected angular velocity ranges, is then calculated by numerical averaging.

As almost all rotor groups to be balanced also include rotors, the angular velocity of which is different from the angular velocity of the rotors to be balanced and in which the naturally existing residual unbalances are not in a fixed phase position to the rotors to be balanced, suitable vibration signal processing is required to eliminate the respective interfering influences. For this purpose, vibration signal processing is preferably carried out, in which the complex rotary-frequent vibration parts are determined from the recorded time signals by Fourier transforms, this step being repeated various times, the determined complex vibration parts being subsequently averaged, and the matrix of coefficients of influence being determined from the averaged complex vibration parts.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2 is a diagrammatic view of a group of synchronously rotating rotors to which vibration pickups are associated that may be arranged in the corresponding bearing plane or also outside the bearing plane; and FIG. 3 shows different possible arrangements of test balance planes and operating balance planes.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1A:
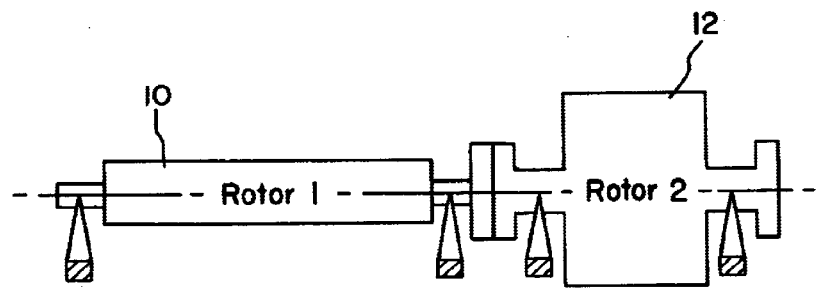
FIG. 1A is a diagrammatic view of a rotor group with, at least two synchronously rotating rotors arranged in one plane.
Figure 1B:
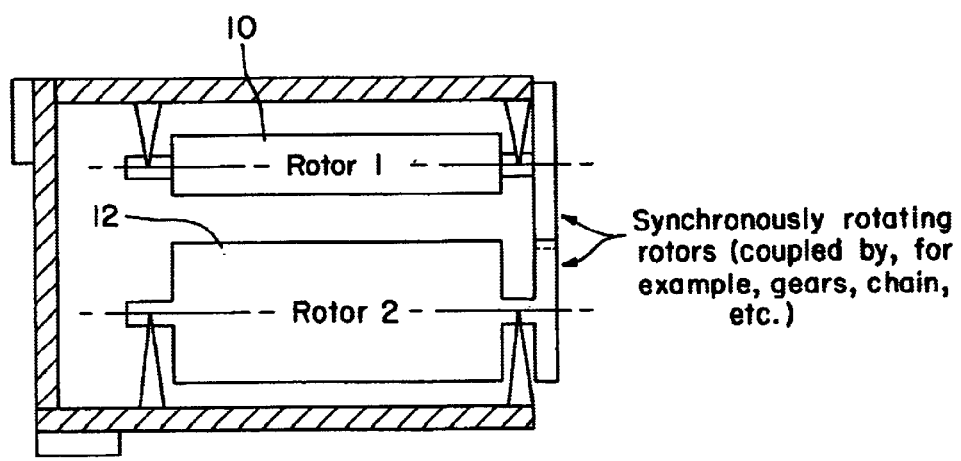
FIG. 1B is a diagrammatic view of a rotor group with at least two synchronously rotating rotors arranged in different planes.

FIGS. 1A and 1B shows a diagrammatic views of two rotor groups with, respectively, at least two synchronously rotating rotors 10, 12 that, in the one case (FIG. 1A), are arranged in one plane and, in the other case (FIG. 1B) in different planes. Rotors 10, 12 of a respective rotor group can, in particular, be coupled mechanically, e.g., by gears, chain, etc.

FIG. 2 shows a diagrammatic view of a group of synchronously rotating rotors 10, 12, to which vibration pickups 14, 16 are associated that can be arranged in the corresponding bearing plane (cf., vibration pickup 14) or also outside the corresponding bearing plane (cf., vibration pickup 16).

FIG. 3 shows different possible arrangements of test balance planes A and operating balance planes B in an exemplary manner.

An exemplary embodiment of the method according to the invention includes an extension of the balancing method that uses coefficients of influence for balancing elastic or rigid rotors with a joint axis of rotation, as is known in literature, to the simultaneous balancing of various rotors 10, 12 (cf., for example FIG. 1) which are mechanically coupled to each other by the rotor supports and bearings (and in the group of which various rotors 10, 12 run at the same speed). Rotors 10, 12 can rotate in different directions of rotation.

For this purpose, the rotor group to be balanced is equipped in every bearing plane or also in other measuring planes, both types of which are test balance planes A, that significantly describe the rotor vibrations, with at least one vibration pickup 14,16 (cf., in particular FIGS. 2 and 3) in one or more directions to be defined. As many impulse and phase transmitters 18 (e.g., triggers and/or the like) must be installed in the rotor group as there are different angular velocities of rotors 10, 12. At the same time, at least the vibration signals of one measuring plane A and the speed signal that pertains to such measuring plane A must be recorded.

According to the "balancing with coefficients of influence" method, the coefficients of influence of every individual test balance plane A are determined for every measuring plane by setting defined test unbalances (i.e., amounts and phase positions of the test unbalances are known). If the basic condition of vibration of the rotor group for every measuring plane is known (i.e., the amplitude and the phase of the rotary-frequent vibration part) and if the conditions of vibration for the different, definedly set test unbalances are known, a matrix of coefficients of influence can be determined, from which the counterbalance mass distribution for the rotor group for every balance plane B can be calculated.

The position of operating balance planes B (i.e., those planes in which the counterbalance masses will subsequently be installed for continuous operation) need not be identical with the position of test balance planes A (i.e., those planes in which test balance weights are installed only during the balancing process, as shown in particular in FIG. 3). To determine the matrix of coefficients of influence, it is rather advantageous to select planes A for the test balance weights that are easily accessible and where it is possible to mount and dismount test balance weights within the shortest possible time. Thus, for instance, the threads (not shown) of pulling screws at the cylinder cover could be used. By mathematical relations, the counterbalance weights that were determined by the matrix of coefficients of influence can be converted to operating balance planes B. The indicated balancing method can be carried out at any determined rotor speed. Optimally, operation balancing is carried out in the main operating speed range, which is particularly applicable to elastic rotors.

If the rotor group to be balanced does not exclusively consist of rigid rotors but, instead, also includes or consists only of elastic rotors, the number of balance planes A, B per rotor 10, 12 can be increased according to the inherent shapes to be balanced. At the same time, it is possible to determine not only one matrix of coefficients of influence, but instead various matrices of coefficients of influence for different, previously defined angular velocities are preferably determined, and, if necessary, a counterbalance mass distribution, at which the vibrations in measuring planes A for the selected angular velocity range are minimized, is calculated by numerical averaging.

As almost all rotor groups to be balanced also include rotors the angular velocity of which is different from the angular velocity of rotors to be balanced and in which the naturally existing residual unbalances are not in a fixed phase position to the rotors to be balanced the respective interfering influences can purposefully be eliminated by suitable vibration signal processing.

For this purpose, it is possible to determine, by Fourier transforms, the complex rotary-frequent vibration parts (i.e., phase and amount of the partial vibration the frequency of which corresponds to the angular velocity of respective rotor 10, 12) from the recorded time signals. This is repeated various times (e.g., 20 times) in succession, and the determined complex vibration parts are subsequently averaged (i.e., average of the rotary-frequent vibration signal in the frequency range). The matrix of the coefficients of influence is determined from the averaged complex vibration parts.

As indicated above, FIG. 3 merely shows different possible arrangements of test balance planes A and operating balance planes B in an exemplary way. For the described method, it is not necessary to execute all possible variants at the same time. What is essential, however, is the fact that operating balance planes B do not have to be identical with test balance planes A.

As can be seen from FIG. 3, not only the position but also the radius of test balance planes A and operating balance planes B can be different.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Voith Paper Patent GmbH

| List of reference numerals | |
| --- | --- |
| 10 | Rotor |
| 12 | Rotor |
| 14 | Vibration pickup |
| 16 | Vibration pickup |
| 18 | Impulse and Phase Transmitter |
| A | Test balance plane |
| B | Operating balance plane |

What is claimed is:

1. A method of simultaneously balancing mechanically coupled, synchronously rotating rotors in a paper machine, comprising the steps of:

providing rotors having different axes of rotation relative to one another, said rotors together defining a rotor group to be balanced, each said rotor having at least one of a bearing plane and an other measuring plane associated therewith, said other measuring plane significantly describing vibrations of said each said rotor, said rotors within said rotor group together having a number of different angular velocities about corresponding said axes of rotation relative to one another;

equipping at least one said rotor of said rotor group with at least one vibration pickup in at least one of each said bearing plane and said other measuring plane thereof;

installing as many impulse and phase transmitters in said rotor group as are provided said number of different angular velocities about said corresponding axes of rotation associated with said rotors within said rotor group;

recording simultaneously at least one pertaining vibration signal and a pertaining speed signal, with regard to a respective one of each said bearing plane and said other measuring plane;

determining for each said bearing plane and said other measuring plane the coefficients of influence thereof by applying a method of coefficients of influence and setting defined test imbalances;

generating at least one corresponding matrix of coefficients of influence; and determining a counterbalance mass distribution from said at least one corresponding matrix of coefficients of influence for every operating balance plane of said rotor group, each said bearing plane and said other measuring plane defining a corresponding test balance plane.

2. The method of claim 1, wherein a position of at least one test balance plane is selected so as to be different from said operating balance plane associated therewith.

3. The method of claim 1, wherein each said rotor has a plurality of rotor vibrations associated therewith, said rotor vibrations being recorded by a plurality of said vibration pickups in at least one specified direction.

4. The method of claim 1, wherein a trigger is used as at least one of said impulse and phase transmitters.

5. The method of claim 1, wherein each said rotor is one of a cylinder and a roller of a papermaking machine.

6. The method of claim 5, wherein each said rotor is one of a dryer cylinder, a guiding roller and a calender roller.

7. The method of claim 1, wherein operation balancing is carried out in a main operating speed range.

8. The method of claim 1, wherein various said matrices of coefficients of influence are simultaneously determined at different specified said angular velocities associated with said rotors.

9. The method of claim 8, wherein said counterbalance mass distribution in said operating balance plane for a range including said different specified said angular velocities are minimized and calculated by numerical averaging.

10. The method of claim 1, wherein vibration signal processing is carried out, complex rotary-frequent vibration parts being determined by Fourier transforms from recorded time signals, the step of determining complex rotary-frequent vibration parts being repeated various times, said determined complex rotary-frequent vibration parts being subsequently averaged, said matrix of coefficients of influence being determined from said averaged complex rotary-frequent vibration parts.

\* \* \* \* \*